(12) United States Patent
Wu et al.

(10) Patent No.: US 11,823,345 B2
(45) Date of Patent: Nov. 21, 2023

(54) EXAMPLE-BASED REAL-TIME CLOTHING SYNTHESIS METHOD

(71) Applicant: ZHEJIANG UNIVERSITY, Hangzhou (CN)

(72) Inventors: Nannan Wu, Hangzhou (CN); Xiaogang Jin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 112 days.

(21) Appl. No.: 17/598,219

(22) PCT Filed: Nov. 20, 2020

(86) PCT No.: PCT/CN2020/130331
§ 371 (c)(1),
(2) Date: Sep. 24, 2021

(87) PCT Pub. No.: WO2021/227425
PCT Pub. Date: Nov. 18, 2021

(65) Prior Publication Data
US 2022/0319140 A1   Oct. 6, 2022

(30) Foreign Application Priority Data

May 12, 2020   (CN) .......................... 202010398301.X

(51) Int. Cl.
*G06T 19/20* (2011.01)
*G06T 13/40* (2011.01)
*G06T 17/20* (2006.01)

(52) U.S. Cl.
CPC .............. *G06T 19/20* (2013.01); *G06T 13/40* (2013.01); *G06T 17/205* (2013.01); *G06T 2210/16* (2013.01); *G06T 2219/2021* (2013.01)

(58) Field of Classification Search
CPC ....... G06T 19/20; G06T 13/40; G06T 17/205; G06T 2210/16; G06T 2219/2021
See application file for complete search history.

(56) References Cited

U.S. PATENT DOCUMENTS

| 11,158,121 B1* | 10/2021 | Tung ...................... G06N 3/045 |
| 2012/0218262 A1 | 8/2012 | Yomdin et al. |
| 2021/0118239 A1* | 4/2021 | Santesteban ......... G06Q 10/067 |

FOREIGN PATENT DOCUMENTS

| CN | 102982578 | 3/2013 |
| CN | 108537888 | 9/2018 |
| CN | 110457584 A * | 11/2019 |

\* cited by examiner

*Primary Examiner* — Xin Sheng
(74) *Attorney, Agent, or Firm* — Jiwen Chen; Joywin IP Law PLLC

(57) ABSTRACT

The invention presents an example-based real-time clothing synthesis method, which includes the following steps: creating the 3D human model according to the input body pose parameters and the body shape parameters; generating 3D clothing deformation on the standard shape and the input pose through a clothing pose model; searching nearby clothing shape models according to the body pose parameters; for each nearby clothing shape model, generating corresponding 3D clothing mesh based on the body shape parameters, and then deforming the clothing mesh toward the input pose using Linear Blend Skinning (LBS) method; synthesizing the clothing deformation for the input body pose and shape using the clothing data obtained in above steps; resolving the interpenetrations between the clothing data and the human model. The invention can generate real-time clothing animation results with detailed wrinkles for various body poses and shapes with different clothing types on a commodity CPU, without resizing the cloth model. It has potential use in assessment of fitness in virtual try-on, as well as in the field of computer animation and video games.

6 Claims, 1 Drawing Sheet

EXAMPLE-BASED REAL-TIME CLOTHING SYNTHESIS METHOD

This is a U.S. national stage application of PCT Application No. PCT/CN2020/130331 under 35 U.S.C. 371, filed Nov. 20, 2020 in Chinese, claiming priority of Chinese Application No. 202010398301.X, filed May 12, 2020, all of which is hereby incorporated by reference.

TECHNOLOGY FIELD

The present invention is related to the technical field of virtual clothes-fitting technology, in particular to a virtual clothes-fitting method based on examples.

BACKGROUND TECHNOLOGY

In everyday life, in order to choose a suitable dress, customers not only need to go to the clothing store (or buy it online), but also need to try on different sizes of clothes to find the best suit for them. The whole process is time-consuming and labor-intensive. Fortunately, virtual clothes-fitting technology is changing this situation. Through virtual try-on, customers can easily and quickly get the effect of trying on clothes of different sizes when they make different movements by themselves, which significantly simplifies the process of selecting clothes. In addition to clothing retail, dressing virtual avatars of various poses and shapes with fitted clothes is essential in video games and virtual cities. This drives researchers to develop effective methods to generate cloth animations as quickly and realistically as possible, including physics-based simulation, and data-driven animation methods.

Physics-based simulation methods directly model the nonlinear behavior of clothing and have proven to produce highly realistic cloth simulations. However, when the cloth mesh is very dense, the simulation will be time-consuming and it is difficult to generate real-time cloth animation. Dressing bodies of different shapes (different customers) requires starting of a separate simulation for every body shape, which makes the physics-based method difficult to be applied to real-time virtual try-on applications.

The data-driven cloth animation method synthesizes cloth deformation from pre-computed clothing deformation samples at different body poses. To achieve real-time performance, these methods compromise the animation quality by simplifying the relationship between the deformed clothing and underlying body poses by assuming linearity or locality. Xu et al. introduced real-time example-based clothing synthesis using sensitivity-optimized rigging to achieve physically-plausible clothing deformation (see Weiwei Xu, Nobuyuki Umentani, Qianwen Chao, Jie Mao, Xiaogang Jin, and Xin Tong. 2014. Sensitivity-optimized Rigging for Example-based Real-Time Clothing Synthesis ACM Trans. Graph. 33, 4 (2014), 107). This method uses a sensitivity-optimized rigging method based on sensitivity analysis, which can generate a more realistic cloth shape. However, their method can only generate clothing deformation for various poses, it did not take body shape into account.

Further taking into account the effect of body posture and shape on cloth deformation, Peng Guan et al. introduced a model of clothing called DRAPE (DRessing Any PErson) which separated clothing deformations due to body shape from those due to pose variation (see Peng Guan, Loretta Reiss, David A Hirshberg, Alexander Weiss, and Michael J Black. 2012. DRAPE: DRessing Any PErson. ACM Trans. Graph. 31, 4 (2012), 35-1). DRAPE can fit avatars of various poses and shapes with customized garments and change the cloth model according to the body shape. However, DRAPE cannot generate fitting results of wearing the same garment under different poses and different body shapes.

A recent contribution by Santesteban et al. trains a learning-based model to predict the deformation of a fixed-size garment under various poses and shapes (Igor Santesteban, Miguel A Otaduy, and Dan Casas. 2019. Learning-Based Animation of Clothing for Virtual Try-On. arXiv preprintarXiv:1903.07190 (2019)). The key novelty of their method is that they added corrective displacements, due to body shape and pose variations, to the template cloth mesh, and then deformed the template mesh using a skinning function. The functional relationship between the correction amount and the posture and body shape of the human body is learned by a neural network. This method can efficiently predict the try-on effect of the same piece of clothing under different postures and different body types. However, its exhaustive database construction procedure requires substantial computational resources.

In the future virtual clothing store, there will be thousands of clothing models. Customers input their personal 3D human models and choose a set of clothing. The system will instantly output the fitting results for various poses. Therefore, it is an important and valuable topic in the field of virtual fitting to propose a clothing synthesis algorithm which can be quickly realized offline and run efficiently online.

SUMMARY OF THE INVENTION

The invention presents an example-based real-time clothing synthesis method, targeting on generating real-time clothing animation for various poses and shapes. Given a clothing model, the method can efficiently generate the example database offline, as well as real-time clothing animation for various poses and shapes at runtime.

The main steps of the example-based real-time clothing synthesis method are as follows:
(1) creating the 3D human model according to the input body pose parameters and the body shape parameters;
(2) according to the body pose parameters, generating 3D clothing deformation on the standard shape and the input pose through a clothing pose model;
(3) according to the body pose parameters, searching nearby clothing shape models;
(4) for each nearby clothing shape model in step (3), generating corresponding 3D clothing mesh based on the body shape parameters, and then deforming the clothing mesh toward the input pose using Linear Blend Skinning (LBS) method;
(5) synthesizing the clothing deformation for the input body pose and shape using the clothing data obtained in step (2) and (4);
(6) resolving the interpenetrations between the clothing data in step (5) and the human model in step (1).

The 3D human model for the input body poses and shapes in step (1) is generated by using SMPL model (Matthew Loper, Naureen Mahmood, Javier Romero, Gerard Pons-Moll, and Michael J Black. 2015. SMPL: A skinned multi-person linear model. ACM Trans. Graph.) 34, 6 (2015), 248.). The pose parameters for SMPL are Euler angles of joints and the shape parameters is a twelve-dimension vector.

The clothing pose model in step (2) refers to the model that is able to generate 3D clothing data according to the input pose parameters, e.g. SOR (Weiwei Xu, Nobuyuki Umentani, Qianwen Chao, Jie Mao, Xiaogang Jin, and Xin Tong. 2014. Sensitivity-optimized rigging for example-based real-time clothing synthesis. ACM Trans. Graph. 33, 4 (2014), 107.). Standard shape refers to the body shape used by the clothing pose model. The clothing pose model only handle various body poses, and the body shape remains unchanged.

The clothing shape model in step (3) refers to the model that is able to generate 3D clothing data according to the input shape parameters while the pose remains fixed. A clothing shape model is built as follows:

(3-1) for a certain pose, generating several 3D human models for different shape parameters $\beta$ using SMPL model, and then simulating clothing for these bodies;

(3-2) converting the clothing coordinate data for the k-th body into a column vector, denoted as $\vec{d}^k$; the coordinate data for all clothing meshes are denoted as a matrix $S=[\vec{d}^1, \vec{d}^2, \ldots, \vec{d}^k, \ldots]$;

(3-3) performing Principal Component Analysis (PCA) on matrix S, then $\vec{d}^k$ can be approximated as:

$$\vec{d}^k = U\vec{\phi}^k + \vec{u} \quad (1)$$

wherein $\vec{u}$ is the mean coordinates of the clothing meshes, matrix U represents the first few principal components of the shape deformation space, and $\vec{\phi}^k$ is the clothing shape parameters.

(3-4) after step (3-3), each clothing $\vec{d}^k$ corresponding to a set of clothing shape parameters $\vec{\phi}^k$ and a set of body shape parameters $\beta^k$. A mapping between $\beta$ and $\phi$ is learned by using L2-regularized least squares with the weight of the regularized term being 0.2:

$$\vec{\phi}' = W \cdot (\vec{\beta}, \vec{\beta}^2, 1)^T \quad (2)$$

wherein $\vec{\phi}'$ is the clothing shape parameters, $\vec{\beta}$ is the body shape parameters, $\vec{\beta}^2$ is the square of $\vec{\beta}$, T is the transpose matrix, and W is the unknown mapping matrix.

Given body shape parameters, we calculated the corresponding clothing shape parameters using equation (2), and then we computed the final clothing coordinate data using equation (1). This is the so-called clothing shape model.

To generate our database, we first sampled a sufficient number of poses from motion sequences representing the whole pose space. In our implementation, we select sufficient amount of motion sequences from use CMU motion capture library (CMU. 2003. CMU graphics lab motion capture database. http://mocap.cs.cmu.edu. (2003).). Then, we use weighted K-means to classify these poses into a certain number of clusters, which will be used to generate our database: clothing shape models. We used the sum of the norm of the sensitivity of a joint, s'', as its weight in the clustering process, calculated as:

$$s^L = \Sigma_{y \in Y} \Sigma_{m=1}^3 \|\bar{s}_{y,m}\| \quad (3)$$

wherein $s^L$ denotes the sensitivity of joint L, Y indicates clothing vertex, and m is the degree of freedom of the joint, and $\bar{s}_{y,m}$ is calculated as:

$$\bar{s}_{y,m} = \frac{1}{N_k} \sum_{k=1}^{N_k} \|s_{y,m}^k\| \quad (4)$$

wherein $s_{y,m}^k$ indicates the coordinate differences of a clothing vertex y under a small joint rotation of m-th joint angle, calculated under the standard pose (T-pose: standing upright with your feet naturally open and your arms flat) and the k-th training shape, and $N_k$ is the number of different body shapes.

To reduce the required clothing shape models in the database, we divided the clothing mesh into several regions in step (3). First, for each clothing vertex, we found its closest body vertex under the standard pose. The skinning weight $w_b^0$ for a clothing vertex is equal to that of its closest body vertex. Second, we partitioned the bones of the human model into $N_g$=7 regions: calf and foot (left and right), femur (left and right), radius and hand (left and right), humerus (left and right), and the remaining part. In this way, our method synthesized the result for each region separately. For each region g, we computed the sensitivity-based distance $D_g^s(\theta)$ between the input pose $\theta$ and the pose of the s-th data point as the weighted sum of differences of joint angles:

$$D_g^s(\theta) = \sum_{y \in Y} w_{g,y} \sum_{m=1}^{3N_L} \|\bar{s}_{y,m} \cdot \Theta_m(\theta, \theta_s)\|^2 = \sum_{m=1}^{3N_L} Q_{g,m} \|\Theta_m(\theta, \theta_s)\|^2 \quad (5)$$

wherein $w_{g,y}$ is the region weight for a clothing vertex y which is computed by summing the bone weights $w_b^0$ for the bones of the current region g, $N_L$ indicates the number of joints, $\bar{s}_{y,m}$ is the same as equation (3), and $\Theta_m(\theta, \theta_s)$ calculates the m-th joint angle difference, and $Q_{g,m}$ reflects the influence of the m-th joint angle on region g which is calculated as:

$$Q_{g,m} = \sum_{y \in Y} w_{g,y} \|\bar{s}_{y,m}\|^2 \quad (6)$$

Each time we changed the body shape, we updated $Q_{g,m}$ for each region once according to the new region weights of clothing vertices. In runtime, our method found several nearby clothing shape models for each region.

In step (4), for each clothing shape model, we first calculated the clothing instances for the input shape and the standard shape, denoted as f($\beta$, $\theta_s$) and f($\beta_0$, $\theta_s$) (the clothing deformation is regarded as a function of body shape parameters $\beta$ and body pose parameters $\theta$). Then we deformed f($\beta$, $\theta_s$) and f($\beta_0$, $\theta_s$) towards the input pose $\theta$ using Linear Blend Skinning (LBS) method. Taking the clothing instance f($\beta$, $\theta_s$) for the s-th clothing shape model as an example, we first found the closest body vertex for each clothing vertex of f($\beta$, $\theta_s$), and set the bone weight $w_b^s$ of a clothing vertex to that of its closest body vertex. Then, we deformed f($\beta$, $\theta_s$) towards the input pose $\theta$ as:

$$\bar{y}^s = \sum_{b=1}^{N_b} w_b^s \left( R_b^{\theta_s, \theta} y^s + T_b^{\theta_s, \theta} \right) \quad (7)$$

wherein $R_b^{\theta_s, \theta}$ and $T_b^{\theta_s, \theta}$ are the relative rotation and translation of bone b from example pose $\theta_s$ to input pose $\theta$, respectively, and $w_b^s$ is the bone weight defined on the clothing vertex $y^s$ of f($\beta$, $\theta_s$).

We denoted equation (7) as $LBS_{\theta_s}^\theta(f(\beta, \theta_s))$, and the LBS deformation for clothing instance under the standard shape $f(\beta_0, \theta_s)$ is basically the same as the above process except for the body shape. We denoted its result as $LBS_{\theta_s}^{\theta}(f(\beta_0,\theta_s))$.

The synthesizing equation in step (5) is:

$$f(\beta, \theta) = f(\beta_0, \theta) + \sum_{s=1}^{N_s} w^s LBS_{\theta_s}^{\theta}(f(\beta, \theta_s)) - \sum_{s=1}^{N_s} w^s LBS_{\theta_s}^{\theta}(f(\beta_0, \theta_s)), \quad (8)$$

wherein $f(\beta, \theta)$ is the clothing data for the input shape $\beta$ and the input pose $\theta$, i.e. the target clothing deformation, $f(\beta_0, \theta)$ is the clothing data for the standard shape $\beta_0$ and the input pose $\theta$, which is generated by the clothing pose model, $\theta_s$ is the pose of the s-th nearby clothing shape model (also known as the s-th example), $f(\beta, \theta_s)$, $f(\beta_0, \theta_s)$ are the clothing deformations for the input shape $\beta$ and the standard shape $\beta_0$ respectively, predicted through the s-th clothing shape model, $N_s$ indicates the number of the nearby clothing shape models, $LBS_{\theta_s}^{\theta}$ deforms clothing mesh from pose $\theta_s$ towards pose $\theta$ using Linear Blend Skinning method (LBS), $\sum_{s=1}^{N_s} w^s LBS_{\theta_s}^{\theta}(f(\beta, \theta_s))$ and $\sum_{s=1}^{N_s} w^s LBS_{\theta_s}^{\theta}(f(\beta_0, \theta_s))$ are the LBS synthesis, and $w^s$ is the weight for the s-th example, which is calculated as (for simplicity, we drop the vertex index for all variables related to clothing mesh vertices):

$$w^s = \sum_{g=1}^{N_G}\left(w_g W_g^s(\theta) / \sum_{s=1}^{N_s} W_g^s(\theta)\right) \quad (9)$$

wherein $w_g$ is the region weight of a clothing vertex for region g, and $W_g^s(\theta)$ is calculated as:

$$W_g^s(\theta)=1/(D_g^s(\theta)+\epsilon)^k \quad (10)$$

wherein $\epsilon$ is a small number in case of zero division, and k regulates the influence of closer examples. Small k tends to smooth the animation and lose fine wrinkles, while large k tends to preserve fine details but results in discontinuity.

Equation (8) is the blend of results of nearby examples, which can also be taken as the blend of approximation results of multiple Taylor expansions.

To prevent sudden changes of the synthesized clothing for sudden input pose changes, we blend the distance at the current time step $D_g^s$ with that of the previous time step $D'_g^s$ as:

$$D_g^s = \eta D'_g^s + (1-\eta)D_g^s \quad (11)$$

wherein $\eta$ is the damping ratio. $D_g^s$ and $D'_g^s$ are the distances of the current and the previous moment, respectively. There might be interpenetrations between the clothing data in step (5) and the human model in step (1), and step (6) use re-projection technique to solve this problem which includes the following steps:

First, when changing body shape, each clothing shape model will generate new clothing mesh for new body shape and recalculate the initial Euclidian distance (referred to as the initial clearance) between each clothing vertex and its closest body vertex.

Second, in the synthesis stage (step (5)), if the clearance between a clothing vertex and its closest body vertex is less than its initial clearance, for each nearby clothing shape model, we re-projected the clothing vertex towards the direction of the normal of its closest body vertex as:

$$\hat{y}^s = y + d^s \cdot \vec{n}$$

$$d^s = \max(0, d_0^s - h^s) \quad (12)$$

wherein $\hat{y}^s$ is the resulting clothing vertex, y is a clothing vertex obtained in step (5), $\vec{n}$ is the normal of the closest body vertex of y; $h^s$ is the current clearance. We set $d_0^s = \min\{h_0^s, \epsilon_p\}$, where $h_0^s$ is the initial clearance for the s-th example, and $\epsilon_p$ is to mimic the penetration depth margin in cloth simulation (in our implementation, we empirically set $\epsilon_p = 5$ mm).

Finally, blend the re-projection results for all nearby examples using the following equation:

$$\bar{y} = \sum_{s=1}^{N_s} w^s \hat{y}^s, \quad (13)$$

wherein $\bar{y}$ is the final position for clothing vertex y; $N_s$ indicates the number of nearby examples; $w^s$ is the weight for the s-th example; $\hat{y}^s$ and is the result obtained through equation (12).

The present invention provides a novel example-based real-time clothing synthesis method, and has the following features:

(1) the present invention formulates the clothing deformation as a high-dimensional function of body shape parameters and pose parameters. In order to accelerate the computation, our formulation factorizes the clothing deformation into two independent components: the deformation introduced by body pose variation (Clothing Pose Model) and the deformation from body shape variation (Clothing Shape Model). The present invention can generate real-time clothing animation results with detailed wrinkles for various body poses and shapes with different clothing types on a commodity CPU, without resizing the cloth model. It has potential practical value.

(2) the present invention provides a novel pose-independent clothing shape model. Given the body shape parameter, it can accurately predict the corresponding clothing shape that fits the input body.

(3) the present invention provides a pose clustering method using the sensitivity of joints to clothes as weights, which can obtain the most representative poses for specific clothes, and is suitable for real-time virtual fitting and other applications.

SPECIFIC IMPLEMENTATION EMBODIMENTS OF THE INVENTION

The following describes the present invention in details with reference to the accompanying figures.

Figure 1:
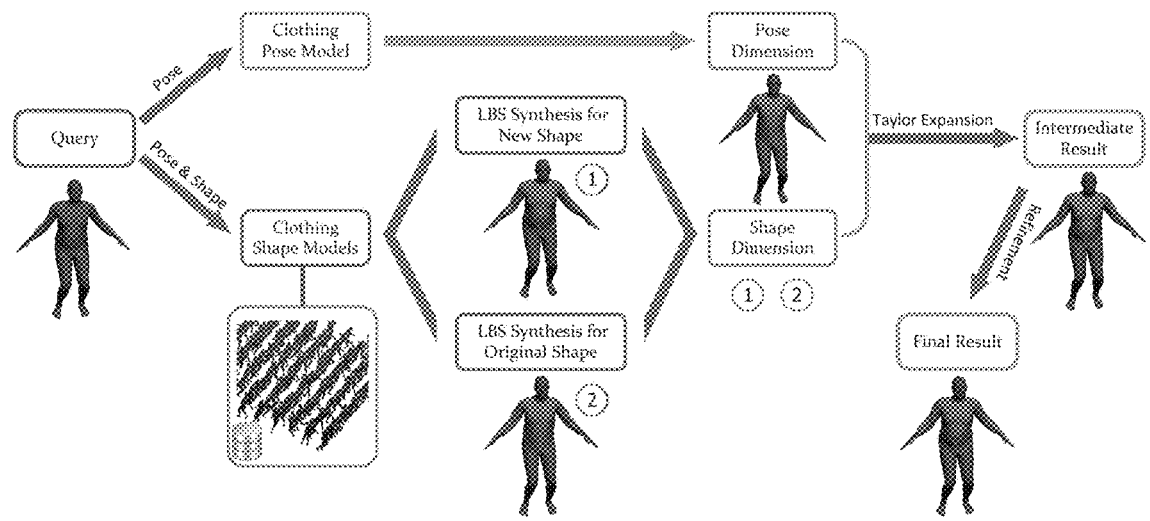
FIG. 1 is the overview of the example-based real-time clothing synthesis method of the present invention.

As shown in FIG. 1, the example-based real-time clothing synthesis method the present invention comprises the following steps:

(1) creating the 3D human model according to the input body pose parameters and the body shape parameters.

The 3D human model is generated using SMPL model (see Matthew Loper, Naureen Mahmood, Javier Romero, Gerard Pons-Moll, and Michael J Black. 2015. SMPL: A skinned multi-person linear model. ACM Trans. Graph.) 34, 6 (2015), 248.). The pose parameters for SMPL is Euler angles of joints and the shape parameters is a twelve-dimension vector.

(2) according to the body pose parameters, generating 3D clothing deformation on the standard shape and the input pose through a clothing pose model.

The clothing pose model refers to the model that is able to generate 3D clothing data according to the input pose parameters, e.g. SOR (see Weiwei Xu, Nobuyuki Umentani, Qianwen Chao, Jie Mao, Xiaogang Jin, and Xin Tong. 2014. Sensitivity-optimized rigging for example-based real-time clothing synthesis. ACM Trans. Graph. 33, 4 (2014), 107.). Standard shape refers to the body shape used by the clothing pose model, generated using SMPL model with shape parameters being zero vector. The clothing pose model only handle various body poses, and the body shape remains unchanged.

Figure 2:
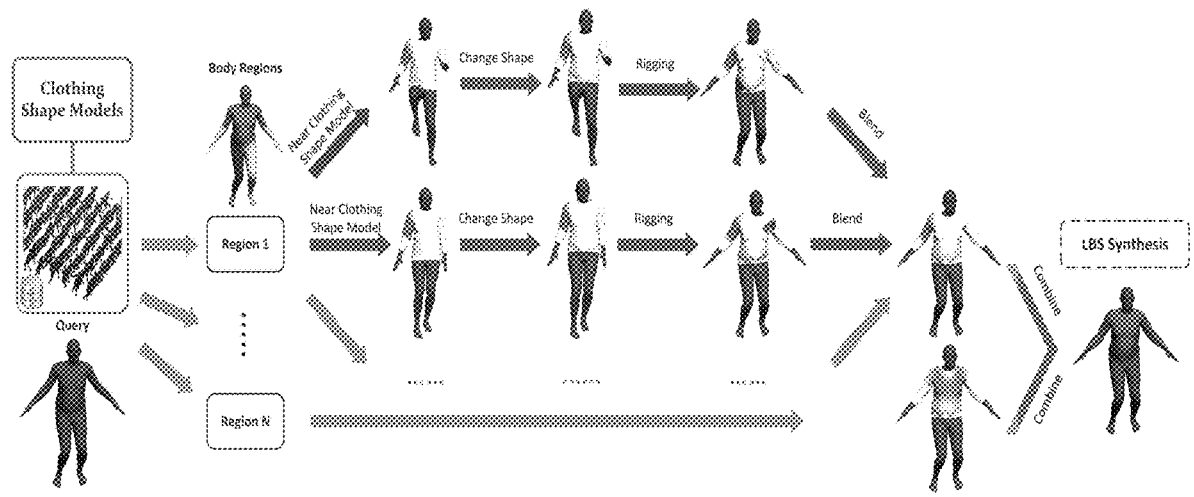
FIG. 2 is the illustration of the computation of the LBS synthesis process of the flow chart of the example-based virtual fitting method provided by the present invention.

(3) according to the body pose parameters, searching nearby clothing shape models, as shown in FIG. 2.

The clothing shape model refers to the model that is able to generate 3D clothing data according to the input shape parameters while the pose remains fixed. A clothing shape model is built as follows:

(3-1) In offline database construction, for a certain pose, generating $N_k=17$ 3D human models for different shape parameters $\beta$ using SMPL model, and then simulating clothing for these bodies. For each of the first 4 principal components of the body shape parameters b in the SMPL model, we generated 4 body shapes ($\beta_k=-2,-1,1,2$), keeping the remaining parameters in $\beta$ as 0. To these 16 body shapes, we added the nominal shape with $\beta=0$. For each generated body shape, we performed a one-second simulation to completely drape the clothing on the avatar.

(3-2) converting the clothing coordinate data for the k-th body into a column vector, denoted as $\vec{d}^k$; the coordinate data for all clothing meshes are denoted as a matrix $S=[\vec{d}^1, \vec{d}^2, \ldots, \vec{d}^k, \ldots]$;

(3-3) performing Principal Component Analysis (PCA) on matrix S, then $\vec{d}^k$ can be approximated as:

$$\vec{d}^k = U\vec{\phi}^k + \vec{u} \qquad (1)$$

wherein $\vec{u}$ is the mean coordinates of the clothing meshes, matrix U represents the first few principal components of the shape deformation space, and $\vec{\phi}^k$ is the clothing shape parameters.

(3-4) after step (3-3), each clothing $\vec{d}^k$ corresponded to a set of clothing shape parameters $\vec{\phi}^k$ and a set of body shape parameters $\beta^k$. A mapping between $\beta$ and $\phi$ was learned using L2-regularized least squares with the weight of the regularized term being 0.2:

$$\vec{\phi}' = W \cdot (\vec{\beta}, \vec{\beta}^2, 1)^T \qquad (2)$$

wherein $\vec{\phi}'$ is the clothing shape parameters, $\vec{\beta}$ is the body shape parameters, $\vec{\beta}^2$ is the square of $\vec{\beta}$, T is the transpose matrix, and W is the unknown mapping matrix.

Given body shape parameters, we calculated the corresponding clothing shape parameters using equation (2), and then we computed the final clothing coordinate data using equation (1). This is the so-called clothing shape model.

To generate our database (clothing shape models), we first sampled a sufficient number of poses from motion sequences representing the whole pose space. In our implementation, we selected a sufficient number of motion sequences from CMU motion capture library (CMU. 2003. CMU graphics lab motion capture database. http://mocap.cs.cmu.edu. (2003).). Then, we used weighted K-means to classify these poses into a certain number of clusters, which will be used to generate our database: clothing shape models. We used the sum of the norm of the sensitivity of a joint, $s^L$, as its weight in the clustering process, calculated as:

$$s^L = \sum_{y \in Y} \sum_{m=1}^{3} = \|\bar{s}_{y,m}\| \qquad (3)$$

wherein $s^L$ denotes the sensitivity of joint L, y indicates clothing vertex, and m is the degree of freedom of the joint, and $\bar{s}_{y,m}$ is calculated as:

$$\bar{s}_{y,m} = \frac{1}{17}\sum_{k=1}^{17} \|s_{y,m}^k\|, \qquad (4)$$

wherein $s_{y,m}^k$ indicates the coordinate differences of a clothing vertex y under a small joint rotation of m-th joint angle, calculated under the standard pose (T-pose: standing upright with your feet naturally open and your arms flat) and the k-th training shape, and 17 different body shapes is the same as in step (3-1).

To reduce the required clothing shape models in the database, we divided the clothing mesh into several regions in step (3). First, for each clothing vertex, we found its closest body vertex under the standard pose. The skinning weight $w_b^0$ for a clothing vertex is equal to that of its closest body vertex. Second, we partitioned the bones of the human model into $N_g=7$ regions: calf and foot (left and right), femur (left and right), radius and hand (left and right), humerus (left and right), and the remaining part. In this way, our method synthesized the result for each region separately. For each region g, we computed the sensitivity-based distance $D_g^s(\theta)$ between the input pose $\theta$ and the pose of the s-th data point as the weighted sum of differences of joint angles:

$$D_g^s(\theta) = \sum_{y \in Y} w_{g,y} \sum_{m=1}^{3N_L} \|\bar{s}_{y,m} \cdot \Theta_m(\theta, \theta_s)\|^2 = \sum_{m=1}^{3N_L} Q_{g,m} \|\Theta_m(\theta, \theta_s)\|^2, \qquad (5)$$

wherein $w_{g,y}$ is the region weight for a clothing vertex y which is computed by summing the bone weights $w_b^0$ for the bones of the current region g, $N_L$ indicates the number of joints, $\bar{s}_{y,m}$ is the same as equation (3), and $\Theta_m(\theta,\theta_s)$ calculates the m-th joint angle difference, and $Q_{g,m}$ reflects the influence of the m-th joint angle on region g which is calculated as:

$$Q_{g,m} = \sum_{y \in Y} w_{g,y} \|\bar{s}_{y,m}\|^2. \qquad (6)$$

Each time we changed the body shape, we updated $Q_{g,m}$ for each region once according to the new region weights of clothing vertices. In runtime, our method found several nearby clothing shape models for each region.

(4) for each nearby clothing shape model in step (3), generating corresponding 3D clothing mesh based on the body shape parameters, and then deforming the clothing mesh toward the input pose using Linear Blend Skinning (LBS) method.

For each clothing shape model, we first calculated the clothing instances for the input shape and the standard shape, denoted as $f(\beta,\theta_s)$ and $f(\beta_0,\theta_s)$ (the clothing deformation is regarded as a function of body shape parameters $\beta$ and body pose parameters $\theta$). Then we deformed $f(\beta,\theta_s)$ and $f(\beta_0, \theta_s)$ towards the input pose $\theta$ using Linear Blend Skinning (LBS) method. Taking the clothing instance $f(\beta, \theta_s)$ for the s-th clothing shape model as an example, we first found the closest body vertex for each clothing vertex of $f(\beta, \theta_s)$, and set the bone weight $w_b^s$ of a clothing vertex to that of its closest body vertex. Then, we deformed $f(\beta, \theta_s)$ towards the input pose $\theta$ as:

$$\overline{y}^s = \sum_{b=1}^{N_b} w_b^s \left( R_b^{\theta_s,\theta} y^s + T_b^{\theta_s,\theta} \right), \quad (7)$$

wherein $R_b^{\theta_s,\theta}$ and $T_b^{\theta_s,\theta}$ are the relative rotation and translation of bone b from example pose $\theta_s$ to input pose $\theta$, respectively, and $w_b^s$ is the bone weight defined on the clothing vertex $y^s$ of $f(\beta, \theta_s)$.

We denoted equation (7) as $LBS_{\theta_s}^\theta(f(\beta,\theta_s))$, and the LBS deformation for clothing instance under the standard shape $f(\beta_0, \theta_s)$ is basically the same as the above process except for the body shape. We denoted its result as $LBS_{\theta_s}^\theta(f(\beta_0,\theta_s))$.

(5) synthesizing the clothing deformation for the input body pose and shape using the clothing data obtained in step (2) and (4);

The synthesizing equation is:

$$f(\beta, \theta) = f(\beta_0, \theta) + \sum_{s=1}^{N_s} w^s LBS_{\theta_s}^\theta(f(\beta, \theta_s)) - \sum_{s=1}^{N_s} w^s LBS_{\theta_s}^\theta(f(\beta_0, \theta_s)), \quad (8)$$

wherein $f(\beta, \theta)$ is the clothing data for the input shape $\beta$ and the input pose $\theta$, i.e. the target clothing deformation, $f(\beta_0, \theta)$ is the clothing data for the standard shape $\beta_0$, and the input pose $\theta$, which is generated by the clothing pose model, $\theta_s$ is the pose of the s-th nearby clothing shape model (also known as the s-th example), $f(\beta, \theta_s)$, $f(\beta_0,\theta_s)$ are the clothing deformations for the input shape $\beta$ and the standard shape $\beta_0$, respectively, predicted through the s-th clothing shape model, $N_s$ indicates the number of the nearby clothing shape models, $LBS_{\theta_s}^\theta$ deforms clothing mesh from pose $\theta_s$ towards pose $\theta$ using Linear Blend Skinning method (LBS), $\Sigma_{s=1}^{N_s} w^s LBS_{\theta_s}^\theta(f(\beta,\theta_s))$ and $\Sigma_{s=1}^{N_s} w^s LBS_{\theta_s}^\theta(f(\beta_0, \theta_s))$ are the LBS synthesis, and $w^s$ is the weight for the s-th example, which is calculated as (for simplicity, we drop the vertex index for all variables related to clothing mesh vertices):

$$w^s = \sum_{g=1}^{N_G} \left( w_g W_g^s(\theta) \Big/ \sum_{s=1}^{N_s} W_g^s(\theta) \right), \quad (9)$$

wherein $w_g$ is the region weight of a clothing vertex for region g, and $W_g^s(\theta)$ is calculated as:

$$W_g^s(\theta) = 1/(D_g^s(\theta) + \epsilon)^k \quad (10)$$

wherein $\epsilon$ is a small number in case of zero division, and k regulates the influence of closer examples. Small k tends to smooth the animation and lose fine wrinkles, while large k tends to preserve fine details but results in discontinuity.

Equation (8) is the blend of results of nearby examples, which can also be taken as the blend of approximation results of multiple Taylor expansions.

To prevent sudden changes of the synthesized clothing for sudden input pose changes, we blended the distance at the current time step D; with that of the previous time step $D'_g{}^s$ as:

$$D_g^s = \eta D'_g{}^s + (1-\eta)D_g^s \quad (11)$$

wherein $\eta$ is the damping ratio. $D_g^s$ and $D'_g{}^s$ are the distances of the current and the previous moment, respectively.

(6) resolving the interpenetrations between the clothing data in step (5) and the human model in step (1) using the re-projection technique which includes the following steps:

First, when change body shape, each clothing shape model will generate new clothing mesh for new body shape and recalculate the initial Euclidian distance (referred to as the initial clearance) between each clothing vertex and its closest body vertex.

Second, in step (5) if the clearance between a clothing vertex and its closest body vertex is less than its initial clearance, for each nearby clothing shape model, we re-project the clothing vertex towards the direction of the normal of its closest body vertex as:

$$\hat{y}^s = y + d^s \cdot \vec{n}$$

$$d^s = \max(0, d_0^s - h^s) \quad (12)$$

wherein $\hat{y}^s$ is the resulting clothing vertex, y is a clothing vertex obtained in step (5), $\vec{n}$ is the normal of the closest body vertex of y; $h^s$ is the current clearance. We set $d_0^s = \min\{h_0^s, \epsilon_p\}$, wherein $h_0^s$ is the initial clearance for the s-th example, and $\epsilon_p$ is to mimic the penetration depth margin in cloth simulation (in our implementation, we empirically set $\epsilon_p = 5$ mm).

Finally, blending the re-projection results for all nearby examples using the following equation:

$$\overline{y} = \sum_{s=1}^{N_s} w^s \hat{y}^s, \quad (13)$$

wherein $\overline{y}$ is the final position for clothing vertex y; $N_s$ indicates the number of nearby examples; $w^s$ is the weight for the s-th example; $\hat{y}^s$ and is the result obtained through equation (12).

The invention claimed is:

1. An example-based real-time clothing synthesis method comprising the following steps:
   (1) creating a 3D human model according to input body pose parameters and body shape parameters;
   (2) according to the body pose parameters, generating 3D clothing deformation on a standard shape and an input pose through a clothing pose model;
   (3) according to the body pose parameters, searching nearby clothing shape models;
   (4) for each nearby clothing shape model in step (3), generating corresponding 3D clothing mesh based on the body shape parameters, and then deforming the clothing mesh toward the input pose using Linear Blend Skinning (LBS) method;
   (5) synthesizing a 3D clothing deformation for the input body pose and the body shape parameters using the clothing data obtained in step (2) and (4); and
   (6) resolving interpenetrations between the clothing data in step (5) and the 3D human model in step (1);

wherein the clothing shape model in step (3) refers to a model that is able to generate 3D clothing data according to the input shape parameters;

wherein the clothing data for the input shape is generated as follows:

(3-1) for a certain pose, generating several 3D human models for different shape parameters $\beta$ using SMPL model, and then simulating clothing for these bodies;

(3-2) converting the clothing coordinate data for the k-th body into a column vector, denoted as $\vec{d}^k$; wherein the coordinate data for all clothing meshes are denoted as a matrix $S=[\vec{d}^1, \vec{d}^2, \ldots, \vec{d}^k, \ldots]$;

(3-3) performing Principal Component Analysis (PCA) on matrix S, then $\vec{d}^k$ can be approximated as:

$$\vec{d}^k = U\vec{\phi}^k + \vec{u} \qquad (1)$$

wherein $\vec{u}$ is the mean coordinates of the clothing meshes, matrix U represents the first few principal components of the shape deformation space, and $\vec{\phi}^k$ is the clothing shape parameters;

(3-4) after step (3-3), each clothing $\vec{d}^k$ corresponding to a set of clothing shape parameters $\vec{\phi}^k$ and a set of body shape parameters $\beta^k$, wherein a mapping between $\beta$ and $\phi$ is learned by using L2-regularized least squares with the weight of the regularized term being 0.2:

$$\vec{\phi}' = W \cdot (\vec{\beta}, \vec{\beta}^2, 1)^T \qquad (2)$$

wherein $\vec{\phi}$ is the clothing shape parameters, $\vec{\beta}$ is the body shape parameters, $\vec{\beta}^2$ is the square of $\vec{\beta}$, T is the transpose matrix, and W is the unknown mapping matrix;

using body shape parameters, calculating the corresponding clothing shape parameters by using equation (2), and then computing final clothing coordinate data using equation (1), which is the clothing shape model.

2. The example-based real-time clothing synthesis method according to claim 1, wherein the 3D human model for the input body pose and shape in step (1) is generated by using SMPL model.

3. The example-based real-time clothing synthesis method according to claim 1, wherein the clothing pose model in step (2) refers to a model that is able to generate 3D clothing data according to the input pose parameters.

4. An example-based real-time clothing synthesis method comprising the following steps:

(1) creating a 3D human model according to input body pose parameters and body shape parameters;

(2) according to the body pose parameters, generating 3D clothing deformation on a standard shape and an input pose through a clothing pose model;

(3) according to the body pose parameters, searching nearby clothing shape models;

(4) for each nearby clothing shape model in step (3), generating corresponding 3D clothing mesh based on the body shape parameters, and then deforming the clothing mesh toward the input pose using Linear Blend Skinning (LBS) method;

(5) synthesizing a 3D clothing deformation for the input body pose and the body shape parameters using the clothing data obtained in step (2) and (4); and (6) resolving interpenetrations between the clothing data in step (5) and the 3D human model in step (1) wherein the clothing data in step (5) are synthesized using the following equation:

$$f(\beta, \theta) = f(\beta_0, \theta) + \sum_{s=1}^{N_s} w^s LBS_{\theta_s}^{\theta}(f(\beta, \theta_s)) - \sum_{s=1}^{N_s} w^s LBS_{\theta_s}^{\theta}(f(\beta_0, \theta_s)) \qquad (8)$$

wherein $f(\beta, \theta)$ is the clothing data for input shape $\beta$ and input pose $\theta$, which is a target clothing deformation, $f(\beta_0, \theta)$ is the clothing data for the standard shape $\beta_0$, and the input pose $\theta$, which is generated by the clothing pose model, $\theta_s$ is the pose of the s-th nearby clothing shape model (also known as the s-th example), $f(\beta, \theta_s)$, $f(\beta_0, \theta_s)$ are the clothing deformations for the input shape $\beta$ and the standard shape $\beta_0$, respectively, predicted through the s-th clothing shape model, $N_s$ indicates the number of the nearby clothing shape models, $LBS_{\theta_s}^{\theta}$ deforms clothing mesh from pose $\theta_s$ towards pose $\theta$ using Linear Blend Skinning method (LBS), and $w^s$ is the weight for the s-th example.

5. An example-based real-time clothing synthesis method comprising the following steps:

(1) creating a 3D human model according to input body pose parameters and body shape parameters;

(2) according to the body pose parameters, generating 3D clothing deformation on a standard shape and an input pose through a clothing pose model;

(3) according to the body pose parameters, searching nearby clothing shape models;

(4) for each nearby clothing shape model in step (3), generating corresponding 3D clothing mesh based on the body shape parameters, and then deforming the clothing mesh toward the input pose using Linear Blend Skinning (LBS) method;

(5) synthesizing a 3D clothing deformation for the input body pose and the body shape parameters using the clothing data obtained in step (2) and (4); and (6) resolving interpenetrations between the clothing data in step (5) and the 3D human model in step (1), wherein step (6) uses re-projection technique to resolve the interpenetrations in step (5).

6. The example-based real-time clothing synthesis method according to claim 5, wherein the re-projection technique comprises the following steps:

(6-1) when body shape is changed, each clothing shape model generating new clothing mesh for new body shape and recalculating the initial Euclidian distance (referred to as the initial clearance) between each clothing vertex and its closest body vertex;

(6-2) in step (5), if the clearance between a clothing vertex and its closest body vertex is less than its initial clearance, for each nearby clothing shape model, re-projecting the clothing vertex towards the direction of the normal of its closest body vertex as:

$$\hat{y}^s = y + d^s \cdot \vec{n}$$

$$d^s = \max(0, d_0^s - h^s) \qquad (12)$$

wherein $\hat{y}^s$ is the resulting clothing vertex, y is a clothing vertex obtained in step (5), $\vec{n}$ is the normal of the closest body vertex of y; $h^s$ is the current clearance; setting $d_0^s = \min\{h_0^s, \epsilon_p\}$, where in $h_0^s$ is the initial clearance for the s-th example, and $\epsilon_p$, is to mimic the penetration depth margin in cloth simulation;

(6-3) blending the re-projection results for all nearby examples using the following equation:

$$\bar{y} = \Sigma_{s=1}^{N_s} w^s \hat{y}^s \qquad (13)$$

wherein $\bar{y}$ is the final position for clothing vertex y; $N_s$ indicates the number of nearby examples; $w^s$ is the weight for the s-th example; $\hat{y}^s$ and is the result obtained through equation (12).

* * * * *